United States Patent [19]

Katoku

[11] Patent Number: 4,654,740
[45] Date of Patent: Mar. 31, 1987

[54] MAGNETIC TAPE CASSETTE WITH TAPE REEL ASSEMBLY HAVING FLOATING REEL HUB

[75] Inventor: Takashi Katoku, Tokyo, Japan

[73] Assignee: Sony Corporation, Tokyo, Japan

[21] Appl. No.: 788,114

[22] Filed: Oct. 16, 1985

[30] Foreign Application Priority Data

Oct. 29, 1984 [JP] Japan .................. 59-164590[U]

[51] Int. Cl.⁴ .......................................... G11B 23/02
[52] U.S. Cl. .................................. 360/132; 242/199
[58] Field of Search ............... 360/132; 242/198–199

[56] References Cited

U.S. PATENT DOCUMENTS

| 4,309,002 | 1/1982 | Saitou et al. | 242/198 |
| 4,467,377 | 8/1984 | Komatsubara et al. | 360/132 X |
| 4,492,998 | 1/1985 | Kamimura et al. | 360/132 |

FOREIGN PATENT DOCUMENTS 2706194 8/1977 Fed. Rep. of Germany ...... 360/132
63668 6/1925 Sweden .............................. 360/132

Primary Examiner—John H. Wolff
Attorney, Agent, or Firm—Lewis H. Eslinger; Alvin Sinderbrand

[57] ABSTRACT

A magnetic tape cassette comprises a cassette casing housing a pair of tape reel assemblies around which a magnetic tape is wound. Each tape reel assembly comprises a reel hub and a center core. The reel hub is associated with the central core so as to be free to move independently of the central core in a direction parallel to the rotational axis of the tape reel assembly. This allows axial movement of the central core for engagement with a reel shaft during thrust-loading. The reel line hub is, in turn, associated tape. By allowing the reel hub to float axially relative to the center core, and hence relative to the reel drive shaft, the reel hub to float axially relative to the central shaft, axial movement of the central core ensures that the reel hub will not apply stress to the tape during loading.

7 Claims, 6 Drawing Figures

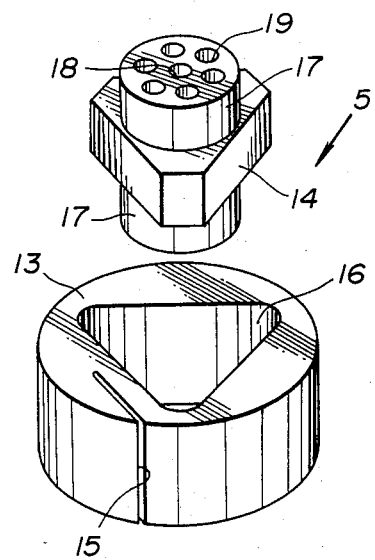
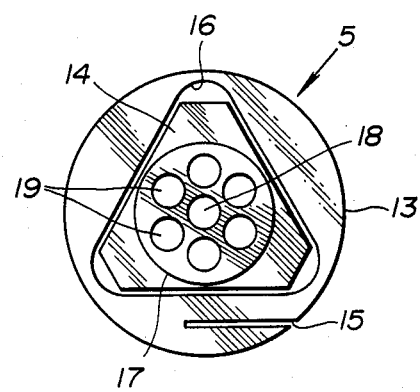
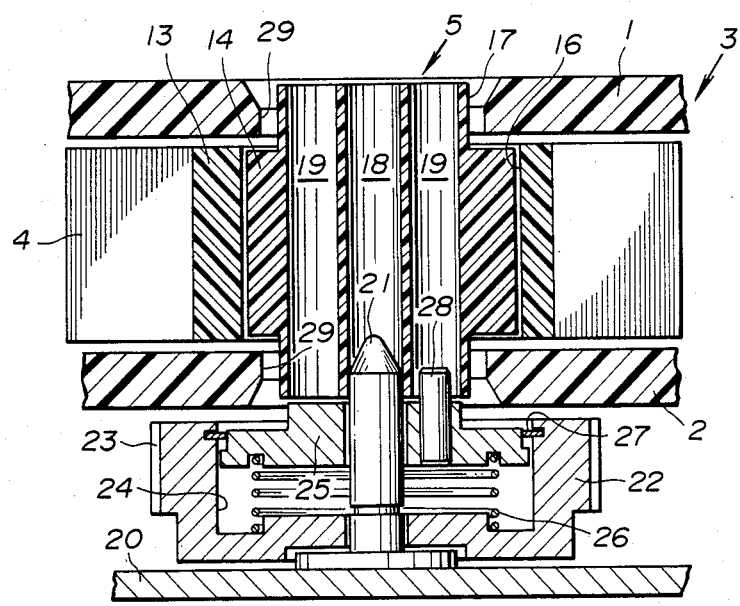

4,654,740

MAGNETIC TAPE CASSETTE WITH TAPE REEL ASSEMBLY HAVING FLOATING REEL HUB

BACKGROUND OF THE INVENTION

The present invention relates generally to a magnetic tape cassette particularly adapted for thrust-loading. More specifically, the invention relates to a magnetic tape cassette having tape reel assemblies each with a reel hub which floats axially and cooperates with a center core of the respective reel assembly for rotation therewith.

In general, a magnetic tape cassette has a pair of tape reel assemblies with central through openings or bores for receiving a reel shaft of a recording and reproducing apparatus, such as, a tape player unit. The through openings in the tape reel assemblies have radially opening grooves or recesses. The reel shafts have a plurality of radial extensions or drive lugs which conform to the radial recesses or grooves in the through openings. Engagement between the extensions and the grooves rotatably couples of the tape reels with the respective reel shaft for recording and reproducing of the data.

In the magnetic tape cassette constructed as set forth above, the magnetic tape tends to be stressed through the tape reels upon loading. Such stress is apt to damage the magnetic tape and to affect performance and/or quality of recording and reproduction.

In addition, in such typical magnetic tape cassettes, it is necessary to insert the reel shaft into the through opening deep enough to establish engagement between the extensions and the grooves. Conventionally, in order to obtain satisfactory engagement between the extensions and grooves, it has been necessary to insert the reel shaft to a depth of at least half of the overall axial length of the through openings. This type of tape cassette cannot be loaded in a player unit with a tape-loading mechanism of the so-called thrust-loading type. In thrust-loading, the reel shaft is inserted into the openings or bore of the respective tape reel to a relatively shallow extent. On the other hand, thrust-loading of tape cassettes is known to be advantageous in that it requires less vertical clearance for loading the tape.

In order to form a more compact, in particular a thinner tape player unit, it is desirable to employ a thrust-loading system. Thus, a magnetic tape cassette suitable for thrust-loading is required.

OBJECTS AND SUMMARY OF THE INVENTION

Therefore, it is a principal object of the invention to provide a magnetic tape cassette which can avoid stressing of the magnetic tape upon loading.

Another object of the invention is to provide a magnetic tape cassette having a tape reel assembly with a reel hub supported in an axially-floating condition and which can be driven by a reel shaft of the tape player.

In order to accomplish the above-mentioned and other objects, a magnetic tape cassette, according to the invention, comprises a cassette casing housing a pair of tape reel assemblies around which a magnetic tape is wound. Each tape reel assembly comprises a reel hub and a center core. The reel hub is associated with the central core so as to be free to move independently of the central core in a direction parallel to the rotational axis of the tape reel assembly. This allows axial movement of the central core for engagement with a reel shaft during thrust-loading. The reel hub is, in turn, associated with the central core for rotation therewith when the central core is driven by the reel shaft to drive the tape.

By allowing the reel hub of the tape reel assembly to float axially relative to the central core, axial movement of the central core during loading ensures that the reel hub will not apply stress to the tape during loading.

In addition, according to specific embodiments, the magnetic tape cassette can be adapted for thrust-loading for enabling reduction of the vertical size of the tape player unit or recording and reproducing apparatus. Floating of the reel hub relative to the central core so that the latter can axially move independently of the reel hub allows the magnetic tape cassette to be loaded in a tape player of the thrust-loading type.

According to one aspect of the invention, a magnetic tape cassette comprises a cassette casing having opposed panels or walls formed with registered openings, and at least one tape reel disposed within the cassette casing and including a reel hub having a periphery on which the magnetic tape is wound, and a central polygonal hole extending axially through the hub, a central core of polygonal form conforming to the polygonal hole of the reel hub to be received within the polygonal hole in axially movable fashion, and a cylindrical extension extending axially from the central core and having upper and lower ends extending into the openings of upper and lower panels or walls of the cassette casing, the cylindrical extension having an axially extending central bore for receiving a spindle of a tape player unit therein and a plurality of voids extending in parallel relationship to the central bore and spaced radially therefrom for receiving a drive pin of a tape drive mechanism of the tape player.

According to another aspect of the invention, a magnetic tape cassette as aforesaid is combined with a tape player adapted to play the magnetic tape cassette and which comprises a tape drive mechanism for driving a magnetic tape for recording and reproducing, having a center spindle to engage in the central bore and at least one drive pin arranged adjacent the spindle and radially offset from the center axis of the spindle for revolution about the center axis and engagement in one of the voids.

BRIEF DESCRIPTION OF THE DRAWINGS

The present invention will be understood more fully from the detailed description given herebelow and from the accompanying drawings of preferred embodiments of the invention, which, however, should not be taken to limit the invention to the specific embodiment, but are for explanation and understanding only.

In the drawings:

FIG. 2 is an enlarged exploded view of a tape reel of the preferred embodiment of the magnetic tape cassette of FIG. 1;

FIG. 3 is an enlarged plan view of the tape reel of FIG. 2, which shows the tape reel in the assembled position;

FIG. 4 is a section through a tape drive mechanism suitable for driving the preferred embodiment of the magnetic tape cassette of FIG. 1;

DESCRIPTION OF THE PREFERRED EMBODIMENTS

Figure 1:
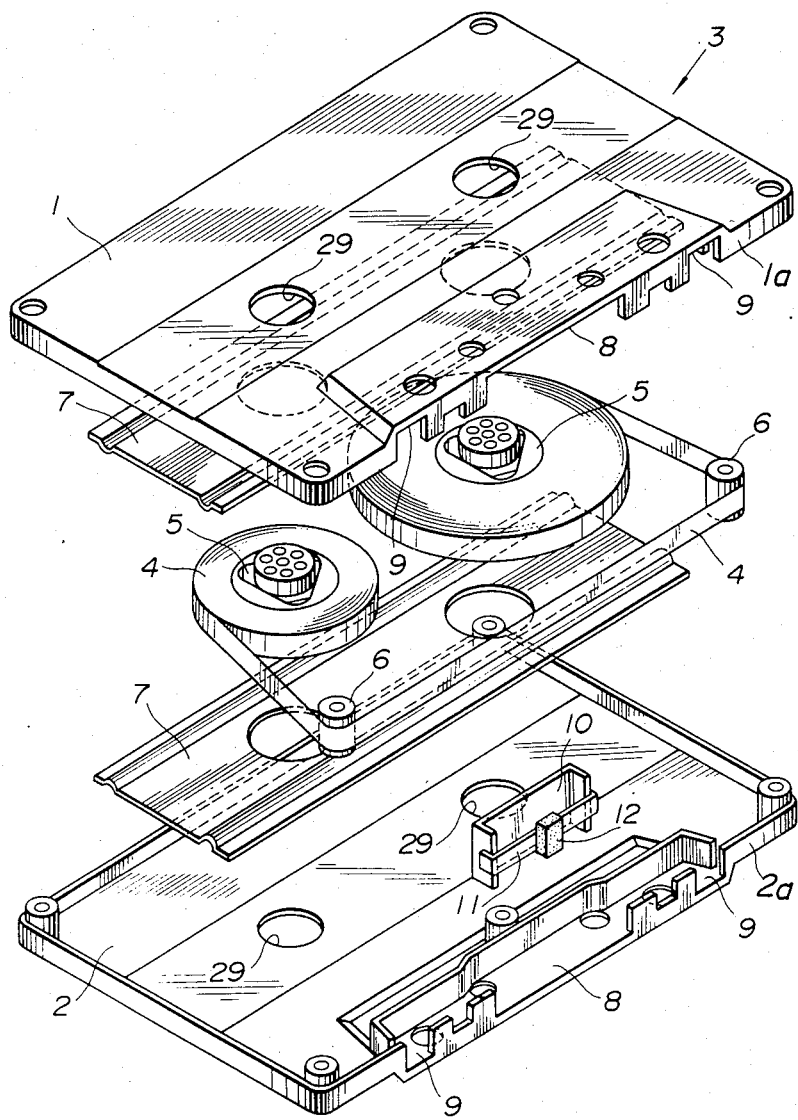
FIG. 1 is an exploded perspective view of the preferred embodiment of a magnetic tape cassette according to the present invention.

Referring now to the drawings, particularly to FIG. 1, the preferred embodiment of a magnetic tape cassette has a cassette casing 3 which comprises an upper casing half 1 and a lower casing half 2. Both of the upper and lower casing halves 1 and 2 are made of synthetic resin and combine to form the cassette casing 3.

It should be noted that the preferred embodiment is designed to form a magnetic tape cassette smaller than the well-known, so-called micro-cassette. In this case, the cassette casing 3, fully assembled may be approximately 33 mm wide, approximately 26 mm long and approximately 6 mm thick, for example.

A pair of tape reels 5 are housed in the cassette casing 3. A magnetic tape serving as a recording medium is wound around the tape reels 5 and stretched therebetween and guided by means of tape guides 6. Upper and lower bearing sheets 7, which are made of a thin resin film, are disposed between the upper and lower surfaces of the tape reels 5 and the opposing surfaces of the upper and lower casing halves 1 and 2.

The cassette casing 3 has a peripheral wall made up of a peripheral flange 1a of the upper casing half 1 and a peripheral flange 2a of the lower casing half 2. The lower and upper edges of the flanges 1a and 2a mate. The front portions of peripheral flanges 1a and 2a have cut-outs 8 forming a head-receiving opening through which a magnetic head of a tape player is inserted into the tape cassette 3. The head-receiving opening 8 is essentially centered at the front of the tape cassette 3. The front portions of flanges 1a and 2a also have cut-outs 9 at either transverse end. The cut-outs 9 form pinch-roller receiving openings, through which pinch rollers of the tape player are inserted. Opposing the head receiving opening 8, there is a shield plate 10 with a tape pad 12 mounted on the shield plate by means of a leaf spring 11, within the cassette casing 3. The tape pad 12 serves to hold the magnetic tape 4 against the magnetic head once the latter is inserted into the head-receiving opening 8.

FIGS. 2 and 3 show the construction of each tape reel 5 in greater detail. Each tape reel 5 comprises a hub 13 of generally cylindrical form and a center core 14 extending through the hub. The hub 13 has a cylindrical periphery about which the magnetic tape 4 is wound. A non-radial slit 15 extending inward from the outer periphery of the hub 13 retains one end of the tape 4. In practice, the end of the magnetic tape 4 is fixedly held within the slit 15 by way of heat-sealing, bonding or the like.

The hub 13 has a generally triangular opening 16 accommodating the center core 14. The center core 14 has a generally triangular outer configuration conforming to the triangular opening 16 in the hub 13. Cylindrical extensions 17 project axially from the upper and lower surfaces of the center core 14. The upper end of the upward cylindrical extension 17 is received in a circular opening 29 formed in the wall or panel of the upper casing half 1. Similarly, the lower end of the downward cylindrical extension 17 is received in a circular opening 29 formed in the wall or panel of the lower casing half 2.

A central bore 18 extends axially through the cylindrical extensions 17 and the center core 14 and opens at the upper and lower ends of the upward and downward extensions 17. A plurality of, e.g. 6, axial through bores 19 extend through the cylindrical extensions 17 and the center core 14 and are arranged in a circle around the central bore 18. The bores 19 are radially spaced from the central bore 18 and also open at the upper face of the upward cylindrical extension 17 and the lower face of the downward cylindrical extension 17.

FIG. 4 shows the magnetic tape cassette, constructed as above, inserted in a tape player. The tape player has a chassis 20 and a center spindle 21 extending upwards from the chassis. A reel base 22 coaxial with the center spindle 21 rotates therewith. The reel base 22 has a peripheral gear 23 formed thereon so as to be engageable with a power train (not shown) of the driving mechanism to receive a driving force. The reel base 22 has a recess 24 housing a drive disc 25. The drive disc 25 is biased upwardly by means of a bias spring 26. A stopper ring 27 projecting inward into the recess 24 limits the upward travel of the drive disc. A drive pin 28 projects upwards from the upper surface of the drive disc. The drive pin 28 is offset radially from the axis of rotation of the drive mechanism. The magnitude of the radial offset of the drive pin 28 matches the radial offset of the bores 19 from the axis of the central bore 18.

The drive disc 25 is suitably rotatably coupled with the reel base 22 for rotation therewith. On the other hand, the drive disc 25 is free to move axially independently of the reel base 22. Similarly, since the periphery of the center core 14 conforms to the inner periphery of the triangular opening 16 of the hub 13, the center core 14 and the hub 13 rotate together. At the same time, the center core 14 remains free to move axially independently of the hub 13.

As is apparent from FIG. 4, the center spindle 21 of the tape player is substantially shorter than the conventional center spindle. Therefore, the center spindle 21 projects a substantially shorter distance into the central bore 18 of the center core 14 than in the conventional system. The drive pin 28 of the drive disc 25 engages in one of the bores 19 in the center core 14 to transmit rotational driving force from the reel base 22 to the center core 14. Therefore, the center core 14 is driven to rotate together with the reel base 22 and the drive disc 25. Since the center core 14 cooperates with the hub 13 for rotation therewith, the hub 13 is also driven to rotate with the reel base 22. The magnetic tape 4 wound around the hub 13 is thus driven by rotation of the reel base 22 to run past the head-receiving opening 8 between the tape guides 6. Thus, on loading, the tape is loaded in respect to the magnetic head (not shown) of the tape player projecting through the head-receiving opening 8 for recording and reproduction.

In the illustrated embodiment, since the center spindle 21 and the drive pin 28 project a relatively short distance into the central bore 18 and one of the bores 19 of the center core, so-called thrust-loading of the tape cassette is possible. This substantially lowers the required vertical movement of the tape cassette 3 relative to the reel base 22 and so reduces the required overall minimum height of the tape player.

Furthermore, since the center core 14 is axially movable independently of the hub 13, stress exerted on the center core 14, which is a natural consequence of loading the tape cassette into the tape player, is not transmitted to the hub 13 and the tape. Such stress tends to be exerted vertically when the tape cassette 3 is inserted into the tape player. Also, even if the center core should lie oblique to the rotation axis, the driving force can be accurately transmitted by the center core 14 to the reel hub 13.

Various modifications to the tape cassette and the tape player of the aforementioned embodiment are possible without negating the novel advantages of the invention. Some examples of such modifications are described herebelow with reference to FIGS. 5 and 6. In the discussion below, the elements corresponding to those in the first described embodiment will be referred to by the same reference numerals.

Figure 5:
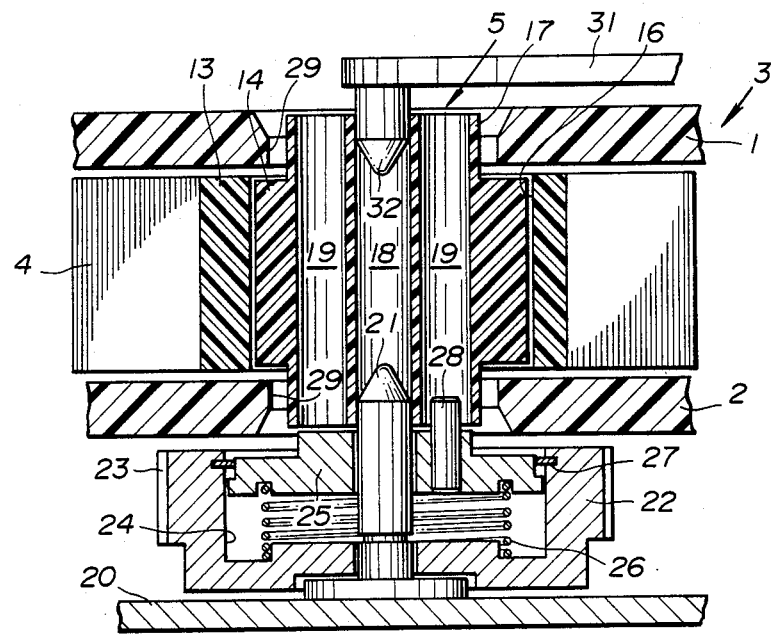
FIG. 5 is a section through another tape drive mechanism suitable for driving the preferred embodiment of the magnetic tape cassette of FIG. 1.

In FIG. 5, a tape player is provided with an auxiliary spindle 32 in addition to the center spindle 21. The auxiliary spindle 32 is mounted on a resilient support 31 and aligned with the center spindle. The auxiliary spindle 32 is designed to engage the upper end of the central bore 18 of the center core 14. This auxiliary spindle 32 cooperates with the center spindle 21 to hold the center core 14 with its axis perpendicular to the plane of rotation of reel base 22 for preventing displacement of the center core relative to the rotation axis.

Figure 6:
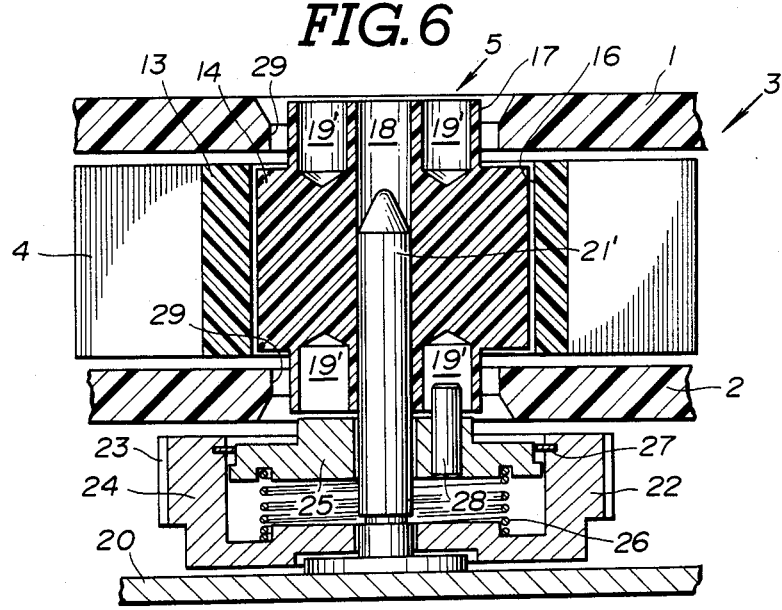
FIG. 6 is a section through still another tape drive mechanism suitable for driving a modified magnetic tape cassette.

FIG. 6 shows another modification, in which the through bores 19 of the previously described embodiments are replaced with blind bores 19' in the opposite end portions of extensions 17. These bores 19' are deep enough to accommodate the drive pin 28. In this modification, the center spindle 21 is longer than in foregoing embodiments, so that it extends over half-way through the central bore 18. Therefore, this modified structure is not suitable for thrust-loading but is designed for normal elevating-loading systems or cassette holder systems. With this arrangement, inclination of the center core 14 relative to the rotation axis can also be successfully prevented. At the same time, with this embodiment, any stress that may be exerted on the tape reel would be absorbed by the axially floating engagement between the center core 14 and the reel hub 13.

While some specific modifications of the preferred embodiment have been described hereabove, the invention can be embodied in various ways not illustrated hereabove. Therefore, the invention should be understood to include all possible variations and modifications of the illustrated embodiments which do not depart from the principles of the invention are set out in the appended claims.

What is claimed is:

1. A magnetic tape cassette comprising:
   a cassette casing having spaced upper and lower walls formed with registered openings; and
   at least one tape reel disposed within said cassette casing and having a magnetic tape wound therearound, said tape reel including
   a reel hub having a cylindrical periphery, on which said magnetic tape is wound, and a central polygonal hole extending through the hub along the axis thereof;
   a center core of polygonal outer configuration conforming to said polygonal hole of said reel hub and received within said polygonal hole in axially movable fashion; and
   a cylindrical extension extending axially from said center core and having upper and lower end portions extending into said registered openings of upper and lower walls of said cassette casing, said cylindrical extension having an axially extending central bore opening at the ends of said extension for receiving a spindle of a tape player therein and a plurality of voids extending in parallel, radially spaced relationship to the central bore and also opening at said ends of said extension for receiving a drive pin in a tape drive mechanism of said tape player.

2. The magnetic tape cassette as set forth in claim 1, wherein said reel hub has a tape end clamp for clamping the end of said magnetic tape.

3. The magnetic tape cassette as set forth in claim 1, wherein said polygonal hole formed in said reel hub is of generally triangular configuration as viewed in a plane perpendicular to said axis of the hub and said center core is also of generally triangular configuration as viewed in a plane normal to the axis of said central bore.

4. In the combination of a magnetic tape cassette and a tape player adapted to play said magnetic tape cassette:
   said tape player comprising a tape drive mechanism for driving a magnetic tape during recording and reproducing and including a center spindle and at least one drive pin arranged against said spindle and radially offset from the center axis of said spindle for revolution about said center axis;
   said magnetic tape cassette comprising
   a cassette casing housing therein a magnetic tape and having opposed walls with registered openings therein;
   a tape reel disposed within said cassette casing and having said magnetic tape wound therearound, said tape reel including a reel hub with a cylindrical outer periphery on which said magnetic tape is wound and a hole of non-circular configuration extending through said reel hub in the axial direction of the latter, and a center core having an outer periphery of a non-circular configuration corresponding to said configuration of the hole and being received in said hole of said reel hub for rotation therewith and axially movable independently of said reel hub, said center core having axially directed cylindrical extensions rotatable in said openings of the cassette casing and provided with an axially extending center opening and a plurality of voids extending in parallel to said center opening and radially offset relative to the rotation axis of said core, said center opening being adapted to receive said spindle of said tape drive mechanism of said tape player and said voids being adapted to receive said drive pin of said tape drive mechanism.

5. The combination as set forth in claim 4, wherein said spindle of said tape drive mechanism is adapted to enter said center opening of said center core for a length substantially less than half of the overall axial length of said center opening.

6. The combination as set forth in claim 4, wherein said non-circular configurations of said hole in the reel hub and of said outer periphery of the center core are polygonal.

7. The combination as set forth in claim 6, in which said polygonal configurations are substantially triangular.

* * * * *